US010061625B2

(12) United States Patent
Greenwood et al.

(10) Patent No.: US 10,061,625 B2
(45) Date of Patent: *Aug. 28, 2018

(54) NAVIGATION APPLICATION PROGRAMMING INTERFACE TO ACCOMMODATE MULTIPLE WAYPOINT ROUTING

(71) Applicant: Google Inc., Mountain View, CA (US)

(72) Inventors: Benjamin Greenwood, Rozelle (AU); Joseph Laurence Scarr, Camperdown (AU)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,683

(22) Filed: Mar. 25, 2016

(65) Prior Publication Data

US 2017/0277578 A1    Sep. 28, 2017

(51) Int. Cl.
*G06F 3/00* (2006.01)
*G06F 9/54* (2006.01)
(Continued)

(52) U.S. Cl.
CPC .......... *G06F 9/541* (2013.01); *G01C 21/367* (2013.01); *G01C 21/3676* (2013.01); *G06F 8/38* (2013.01); *G06F 9/44505* (2013.01)

(58) Field of Classification Search
CPC ....................................................... G06F 9/54
(Continued)

(56) References Cited

U.S. PATENT DOCUMENTS 6,901,594 B1 * 5/2005 Cain ................. G06F 9/542
                                                     709/227
7,228,225 B1 * 6/2007 Walters .............. G01C 21/26
                                                     701/431
(Continued)

FOREIGN PATENT DOCUMENTS

EP         2 546 741         1/2013

OTHER PUBLICATIONS

Jinthana, A Comparative Study of Random Waypoint and Gauss-Markov Mobility Models in the Performance Evaluation of MANET, 2006.*

(Continued)

*Primary Examiner* — Lechi Truong
(74) *Attorney, Agent, or Firm* — Dority & Manning, P.A.

(57) ABSTRACT

Navigation application programming interfaces that can be used to embed navigation services in software applications are provided. In one embodiment, the application programming interface includes a first set of instructions specifying one or more first parameters to control the implementation of a navigation service by the software application. The navigation service can provide navigation information to a user of the software application. The application programming interface can include a second set of instructions specifying one or more second parameters to control interaction with a navigation engine provided by the navigation data provider via the application programming interface. The application programming interface can further include a waypoint function specified as part of the first instructions operable to set a plurality of waypoints for a navigation route. The application programming interface can be operable to receive a multi-waypoint navigation route determined based on the plurality of waypoints.

16 Claims, 9 Drawing Sheets

(51) Int. Cl.
*G06F 8/38* (2018.01)
*G06F 9/445* (2018.01)
*G01C 21/36* (2006.01)

(58) Field of Classification Search
USPC .......................................................... 719/328
See application file for complete search history.

(56) References Cited

U.S. PATENT DOCUMENTS

| | | | |
|---|---|---|---|
| 8,849,942 B1 | 9/2014 | Foster et al. | |
| 8,886,460 B1 | 11/2014 | Koeshkerian | |
| 2001/0034754 A1* | 10/2001 | Elwahab | G06F 9/4443 709/201 |
| 2006/0212217 A1* | 9/2006 | Sheha | G01C 21/005 701/412 |
| 2010/0088023 A1* | 4/2010 | Werner | A63B 24/0021 701/467 |
| 2011/0201364 A1 | 8/2011 | Capuozzo et al. | |
| 2012/0159357 A1 | 6/2012 | Lim et al. | |
| 2013/0231889 A1* | 9/2013 | Hrybyk | G01C 21/20 702/141 |
| 2014/0101249 A1* | 4/2014 | Lampe | H04L 65/403 709/204 |
| 2014/0114565 A1 | 4/2014 | Aziz et al. | |
| 2015/0088642 A1 | 3/2015 | Mathew | |
| 2015/0341290 A1* | 11/2015 | Cherifi | H04L 51/043 709/206 |
| 2016/0054137 A1* | 2/2016 | Wheatman | G06F 3/048 701/425 |
| 2016/0191637 A1* | 6/2016 | Memon | H04L 67/20 701/522 |
| 2017/0186328 A1* | 6/2017 | Beernaert | B64F 5/60 |

OTHER PUBLICATIONS

Mustafa et al. "Point-of-Interests Based Best Path Selection Using Cluster-based Routing," IEEE 11$^{th}$ International Symposium on Wireless Communications Systems, Aug. 26, 2014, pp. 690-696.

Howard, "Geofences on Android with GoogleApiClient," Jun. 26, 2015, accessed on Sep. 4, 2016—35 pages.

PCT International Search Report for corresponding PCT Application No. PCT/US2016/065065, dated Feb. 6, 2017—4 pages.

Anonymous, ""How to" for the Android SDK," skobbler http://web.archive.org/web/20160316095427/http://developer.skobbler.com/getting-started/android, Accessed on Jan. 23, 2017—46 pages.

Anonymous, "SDK Release Notes Developer Platform OSM," skobbler, http://web.archive.org/web/20151027041626/http://developer.skobbler.com/release-notes, Accessed on Jan. 23, 2017—10 pages.

Anonymous, "Index (SKMaps Framework)," http://web.archive.org/web/20151206054940/http://developer.skobbler.com/docs/android/2.5.1/index-all.htm, Accessed on Jan. 24, 2017—56 pages.

* cited by examiner

NAVIGATION APPLICATION PROGRAMMING INTERFACE TO ACCOMMODATE MULTIPLE WAYPOINT ROUTING

FIELD

The present disclosure relates generally to application programming interfaces for providing navigation information.

BACKGROUND

Applications implemented on computing devices, such as mobile computing devices (e.g., smartphones, tablets, smart watches, etc.) have been developed for a variety of purposes, including business, social, health, and other purposes. These applications can provide a user interface (e.g., a graphical user interface) for presenting information to a user as well as allowing the user to interact with the application. Popular applications for mobile computing devices include maps applications that make varied geographic information (e.g., current location information presented on a map) available to users.

Application programming interfaces can allow applications implemented on computing devices to interact with various services to provide information and functionality to a user. Application programming interfaces can provide a tool for developers to easily embed information, programming, frameworks, and structures into applications for access by the user. For example, a map service provider can provide a maps application programming interface that can be used by third parties to embed a digital map into a user interface of an application developed by the third party.

SUMMARY

Aspects and advantages of embodiments of the present disclosure will be set forth in part in the following description, or may be learned from the description, or may be learned through practice of the embodiments.

On example aspect of the present disclosure is directed to a non-transitory computer-readable medium storing instructions that implement an application programming interface for providing a navigation service as part of a software application executed on a computing device. The computing device can have one or more processors and a display device. The computing device can be configured to communicate with a navigation data provider via a communication network. The application programming interface can include a first set of instructions specifying one or more first parameters to control the implementation of a navigation service by the software application. The navigation service can be operable to provide navigation information to a user of the software application. The application programming interface can further include a second set of instructions specifying one or more second parameters to control interaction with a navigation engine provided by the navigation data provider via the application programming interface. The application programming interface can further include a waypoint function specified as part of the first instructions operable to set a plurality of waypoints for a navigation route. The application programming interface can be operable to receive a multi-waypoint navigation route determined based on the plurality of waypoints. The multi-waypoint navigation route can include a plurality of route segments.

Other example aspects of the present disclosure are directed to systems, apparatus, tangible, non-transitory computer-readable media, user interfaces, memory devices, and electronic devices for providing a navigation application programming interface.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
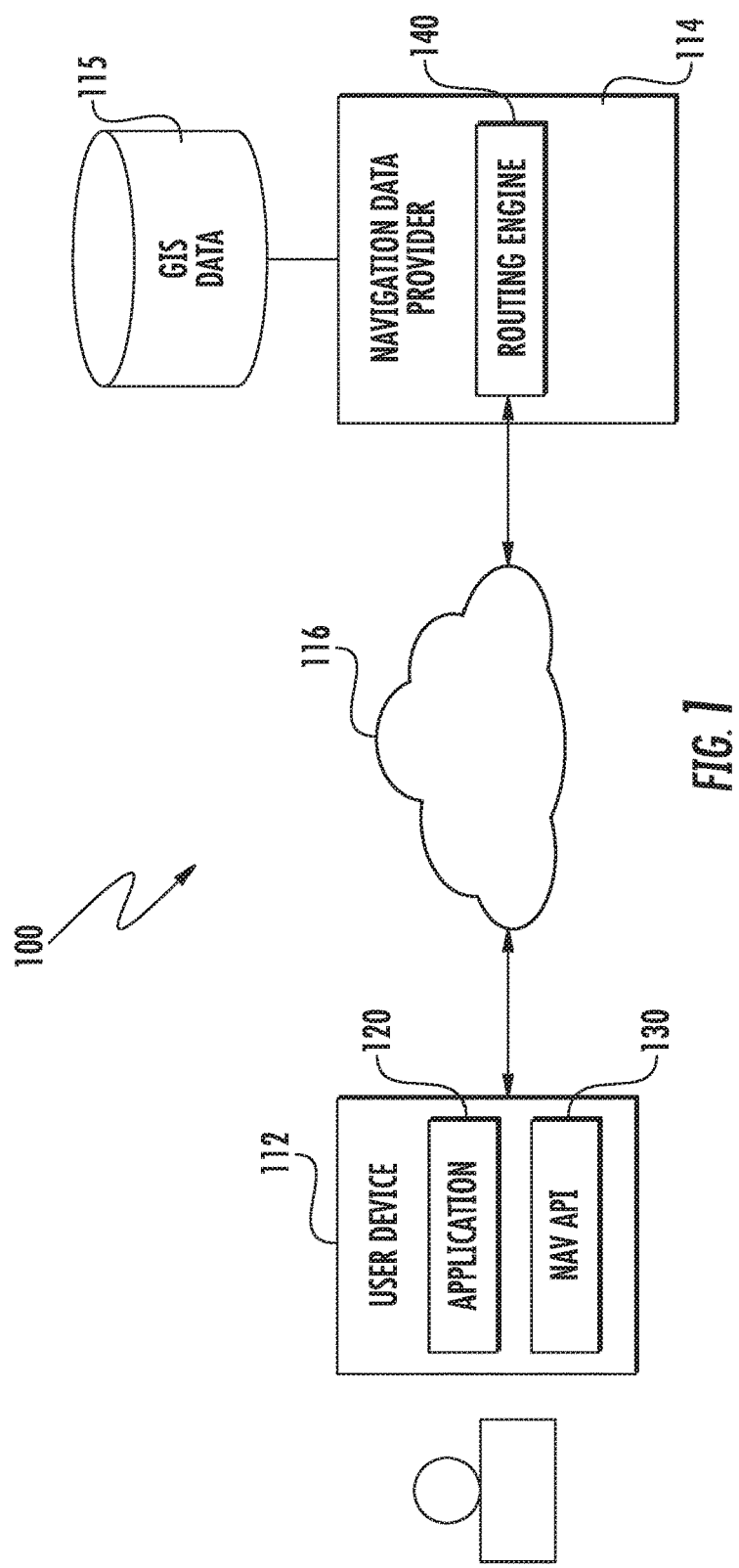
FIG. 1 depicts an overview of an example system for implementing a navigation service as part of a software application using an application programming interface according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to application programming interfaces ("APIs") for providing navigation information in third party software applications implemented on one or more computing devices, such as web-based software applications implemented in a browser, locally-stored software applications, and other applications.

In some embodiments, the API can allow application developers to embed a navigation experience provided by a navigation data provider or other source in their software application. The API can allow the developer to easily customize and tailor the navigation experience to accommodate varying platforms and end use cases.

More specifically, the API, when invoked by a software application implemented on a computing device, can be configured to request and receive routing information from a data provider via a communication interface (e.g., over a network, such as the Internet). The API can be configured present navigation information (e.g., through a graphical user interface component or through audio and/or vibratory cues) based on the routing information to provide a navigation service embedded in the software application. A navigation service can be an application (e.g. a software application) that provides navigation information that can be used to guide a user from an origin and a destination. In some embodiments, the navigation service embedded in the software application can provide navigation information (e.g., turn-by-turn navigation information) to a user as a user traverses along a navigation route or other path. More particularly, in some embodiments, the navigation service can receive a route directing a user from to a current location to a destination. As one example, the route can include a sequence of steps, each describing a route portion (e.g., name or number of the road, distance, travel time, speed limit) and a maneuver (e.g., left turn, merge right, proceed straight) to access the next route portion. The navigation service can provide the route to a user through a graphical user interface and via one or more cues (e.g., audio or video cues) to guide the user from an origin to a destination.

In some embodiments, the software application can interact with a routing engine implemented by a navigation data provider or other source (e.g., a local source of navigation information) via the API to obtain routing information and other navigation information. The navigation data provider can be associated with a separate entity relative to the developer of the software application. For instance, the navigation data provider can be associated with a web server that hosts a geographic information system. The navigation information can include a route to one or more waypoints. The navigation information can further include map data for presentation in conjunction with the route and other information. The navigation information can be continuously updated (e.g., through one or more event listener interfaces implemented as part of the API) as the user traverses the navigation route to provide a real time or near real time navigation experience for a user.

The API when implemented by a software application can visually present the navigation information associated with the navigation service in a graphical user interface component displayed in conjunction with the software application. For instance, the graphical user interface component can display a map. The default display of the map can be, for instance, a top-down view of the map. During a navigation mode, the graphical user interface component can display a route in polyline on the map. The position of the user can be updated along the route as the user navigates the route. For instance, the navigation service can provide a graphical user interface where a position of the user is continuously updated along the navigation route as the user position changes along the navigation route. Various waypoints can be identified by markers located in the map. Other information can be presented in the graphical user interface component, such as estimated time or distance remaining to arrival at a waypoint ("ETD information"), a compass interface element, a navigation heading element, etc. In some embodiments, the navigation information can be provided using audio guidance with or without the visual display of navigation information in the graphical user interface component.

According to particular aspects of the present disclosure, the API can include sets of computer-readable instructions that when executed by one or more processors facilitate integration of the navigation experience into a developer's software application. The sets of instructions, when implemented by one or more processors, can govern interaction by the software application with the navigation data provider via the API as well as the display and/or delivery of navigation information to the user as part of the software application.

More particularly, example instructions associated with an API that are facing a developer of a software application can include a set of instructions specifying one or more parameters that govern the display of the visual output of the navigation service. The API can further include a set of instructions specifying one or more parameters that control the implementation of the navigation service and a set of instructions that governs the interaction of the API with the routing engine provided by the navigation data provider.

According to particular aspects of the present disclosure, the API can include one or more configurable event listener interfaces that when called allow the software application invoking the API to obtain data indicative of various navigation events (e.g., from the navigation data provider over the network). The navigation events can be, for instance, updated user position, a changed route, an update to ETD information, arrival at a waypoint, etc. The configurable event listener interfaces can be used to continuously update the navigation information as a user traverses along a route in a manner desired by the software application developer. For instance, one example event listener interface can be used to update the current location of a user along a navigation route. Another example event listener interface can be used to update ETD information to one or more waypoints. Another example event listener interface can be used to signal when a user has arrived at a particular waypoint. Another example event listener interface can be used when a user diverges from a route determined by the routing engine and the route to a waypoint determined by the routing engine changes.

In some implementations, the API can be configured to accommodate navigation for a plurality of waypoints. Data indicative of the plurality of waypoints can be received via the API, for instance, in a list form ordering the waypoints. The routing engine can determine a multi-waypoint route to the plurality of waypoints. The multi-waypoint route can include a plurality of route segments. Each route segment can be a route between waypoints in the multi-waypoint route or between a start location and a waypoint in the multi-waypoint route.

The API can include one or more event listener interfaces to accommodate providing navigation information based on a multi-waypoint route. For instance, the one or more event listener interfaces can be configured to provide notifications when each waypoint is reached, when ETD information to the next waypoint changes, or when any part of the multi-waypoint route changes. In addition, the one or more event listener interfaces can be configured to provide access to ETD information for each waypoint along the multi-waypoint route, access to geographic coordinates (e.g., latitude and longitude) for each waypoint, access to the information associated with a route segment (e.g. a navigation polyline)

between each waypoint along the multi-waypoint route, and/or access to where the user has been along the multi-waypoint route independently of the route to the next waypoint in the multi-waypoint route.

In this way, the APIs according to example embodiments of the present disclosure can have a technical effect of facilitating the integration of a navigation service provided by a navigation data provider in various software applications. One or more configurable event listener interfaces implemented as part of the APIs can be used to continuously update the navigation information as a user traverses along a navigation route in a manner desired by the developer. The APIs can allow for the customization of the navigation service for various end use needs, such as for ride sharing applications, shipping/delivery applications, social applications, and other end use applications.

FIG. 1 depicts an overview of an example system 100 for implementing a navigation service as part of a software application using a navigation API according to example embodiments of the present disclosure. The system 100 can include a user device 112 that can receive navigation data from a navigation data provider 114 via a communication network 116. The user device 112 can be, for instance, a smartphone, tablet, wearable device, laptop, desktop, mobile device, device capable of being carried by a user while in operation, display with one or more processors, vehicle system, or other user device 112.

A software application 120 can be implemented on the user device 112. The software application can be, for instance, a mapping application, a browser, a ride share application, an application used to assist with delivery, a social media application or other software application that may need to provide navigation information to a user. The software application 120 can be stored locally on the user device 112 or can be, for instance, a web application accessed via a browser implemented on the user device 112. In some embodiments, the software application 120 can be developed by a third party entity that is independent of and/or not affiliated with an entity associated the navigation data provider 114.

The software application 120 can invoke a navigation API 130 to access and provide navigation data from the navigation data provider 114 via the communication network 116 so that a navigation service can be embedded in the software application 120. Example aspects of the present disclosure are discussed with accessing data from a remote navigation data provider 114 for purposes of illustration and discussion. Those of ordinary skill in the art, using the disclosures provided herein, will understand that the API 130 can access data from other sources, such as local sources or applications located on the user device 112.

The navigation service can present navigation information (e.g., turn-by-turn navigation information) to a user in real time or near real time as a user or vehicle carrying the user device 112 traverses along a route from an origin to one or more destinations. The navigation service can include a graphical user interface component for presenting the navigation information to the user on one or more display devices. In addition and/or the navigation service can provide audio guidance or other notifications (e.g., vibratory notifications) to the user indicative of navigation information (e.g., turn-by-turn) directions.

Figure 2:
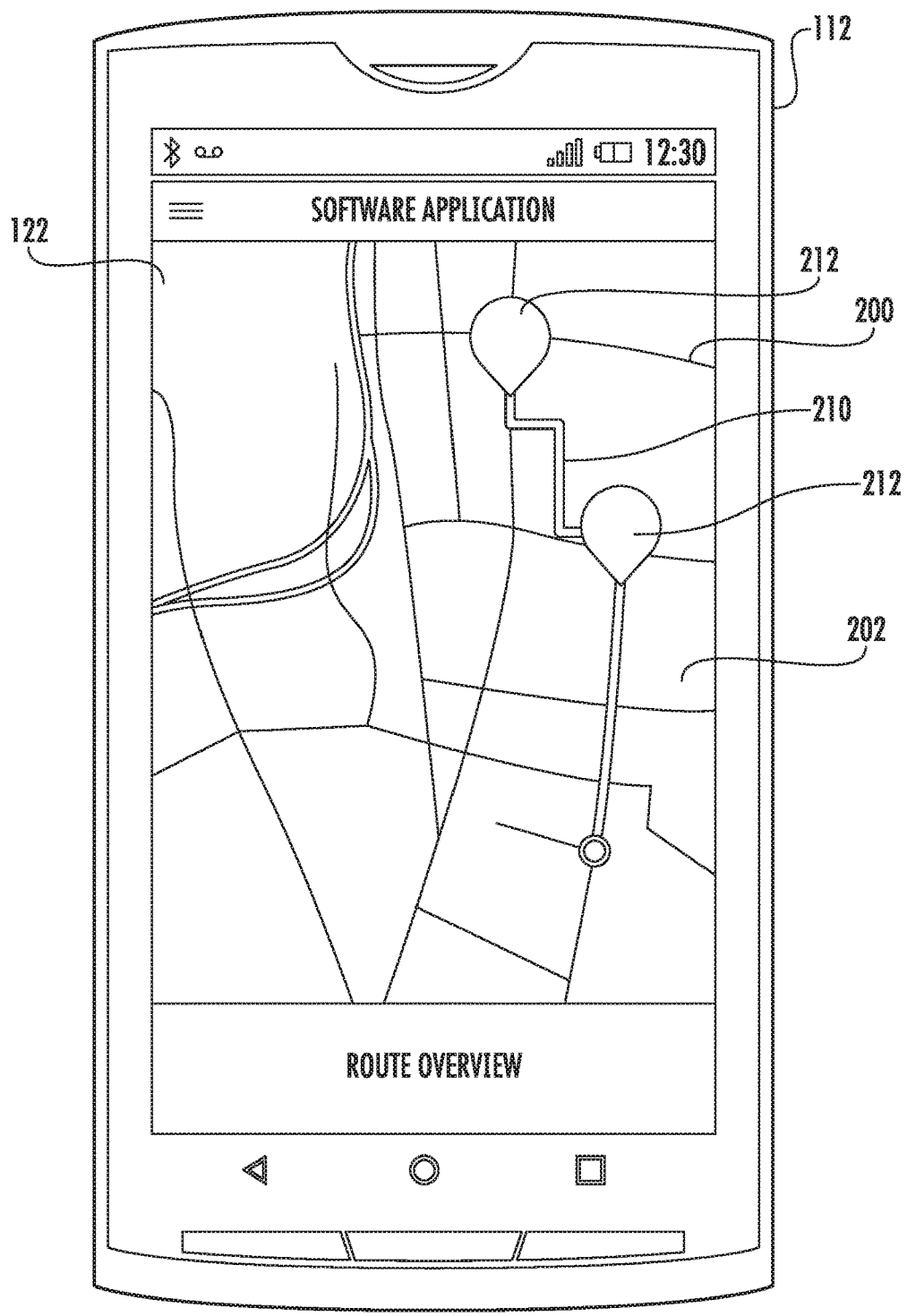
FIGS. 2-3 depicts an example graphical user interface component associated with a navigation service implemented as part of a software application according to example embodiments of the present disclosure.

FIG. 2 depicts an example graphical user interface component 200 associated with a navigation service embedded as part of a graphical user interface 122 of a software application 120 according to example embodiments of the present disclosure. The graphical user interface component 200 can be displayed on a display device of the user device 112. The graphical user interface component 200 can include various interface elements that provide navigation information to a user as part of a navigation service. As shown in FIG. 2, the graphical user interface component 200 includes a map 202 as well as a route 210 presented on the map 202. In addition, markers 212 indicative of waypoints can be presented on the map 202. The route 210 is displayed on a top down view of the map 202 to provide a route overview. According to example embodiments of the present disclosure, data associated with the map 202, the route 210 and information associated with the waypoints 212, and other navigation information can be obtained from a navigation data provider 114 via an API 130 invoked by the software application 120 as will be discussed in more detail below.

Figure 3:
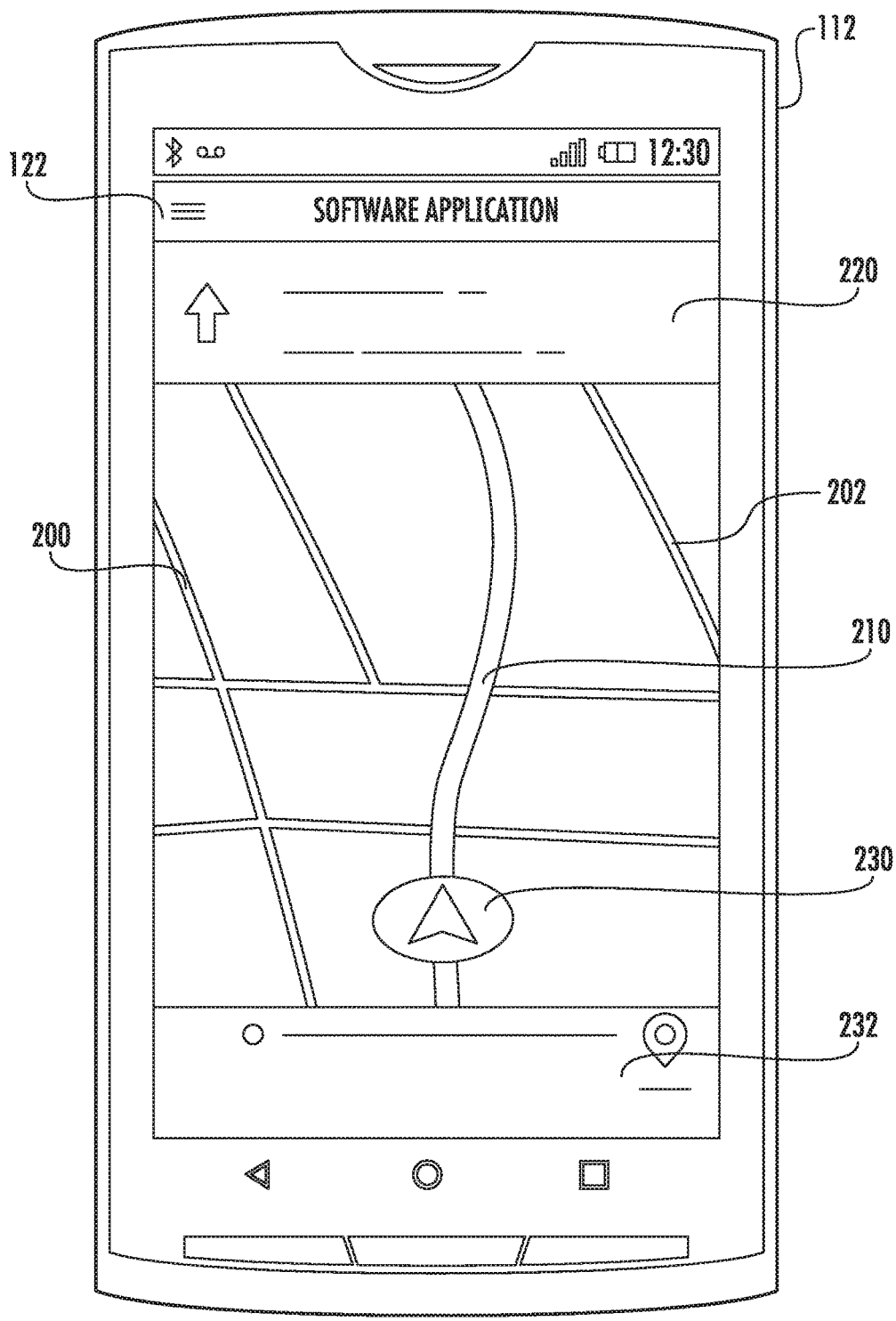

FIG. 3 depicts another aspect of an example graphical user interface component 200 associated with a navigation service embedded as part of a graphical user interface 122 of a software application 120 according to example embodiments of the present disclosure. In the example of FIG. 3, the navigation service can be providing turn-by-turn navigation directions with the graphical user interface component 200 as the user or vehicle traverses a route in real time or near real time. The graphical user interface component 200 can include various interface elements for presenting navigation information to a user. For instance, the graphical user interface component 200 can include a map 202 and a route 210 presented in polyline on the map 202. The graphical user interface component 200 can further present indicia 230 indicative of a current position of the user or vehicle traveling along the route 210. The indicia 230 can move along the route 210 as the user or vehicle travels along the route 210.

The graphical user interface component 200 can present other information to the user that can be useful in navigation. For instance, the graphical user interface component 200 can further include a navigation header element 220 that can display the current navigation direction and other information associated with a current portion of the route. In addition, the graphical user interface component 220 can display ETD information 232, such as estimated minutes or estimated distance to arrival to the next waypoint. According to example embodiments of the present disclosure, data associated with the map 202, the route 210, etc. can be obtained from a navigation data provider 114 or other source via an API 130 invoked by the software application 120. One or more event listener interfaces implemented as part of the navigation programming interface 130 can be used to update the navigation information as the user or vehicle travels along the route.

The example graphical user interface components 200 can be displayed when the API 130 is operating in a navigation mode. The navigation mode can be entered based on various events, such as the specifying of one or more waypoints and/or the receipt of a user input signaling the desire to begin a navigation mode. In some embodiments, the graphical user interface component 200 can display the route 210 when operating in the navigation mode. When not operating in the navigation mode, the graphical user interface component 200 can simply display a top down view of a map or other suitable view of the map.

FIGS. 2 and 3 depict one example implementation of a graphical user interface component associated with a navigation service that can be embedded in an application 120 using a navigation API 130 according to example embodiments of the present disclosure. The navigation service can present navigation information in other suitable forms without deviating from the scope of the present disclosure.

Referring back to FIG. 1, the API 130 can be configured to interface with a routing engine 140 implemented by the navigation data provider 114. The routing engine 140 can be configured to, for instance, compute routes to one or more waypoints, access mapping data, update navigation data based on various navigation events, and respond to requests for navigation data from the API 130. In some embodiments, the navigation data provider 114 can include one or more servers, such as web servers. The one or more servers can include one or more processors and one or more memory devices. The one or more memory devices can store computer-readable instruction to implement, for instance, the routing engine 140. In some embodiments, the routing engine 140 can access data associated, for instance, with a geographic information system 115. The geographic information system 115 can include data that indexed by geographic coordinates of its elements. The data associated with the geographic information system 115 can include, for instance, map data, route data, geographic imagery, data associated with various waypoints (e.g., business listing names, addresses, geographic coordinates, etc.) and other data.

The application 120 can implement a navigation service by interacting with the navigation data provider 114 via the API 130 over the network 116. The network 116 can be any type of communications network, such as a local area network (e.g. intranet), wide area network (e.g. Internet), cellular network, or some combination thereof. The network 116 can also include a direct connection. In general, communication can be carried via network 116 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 4:
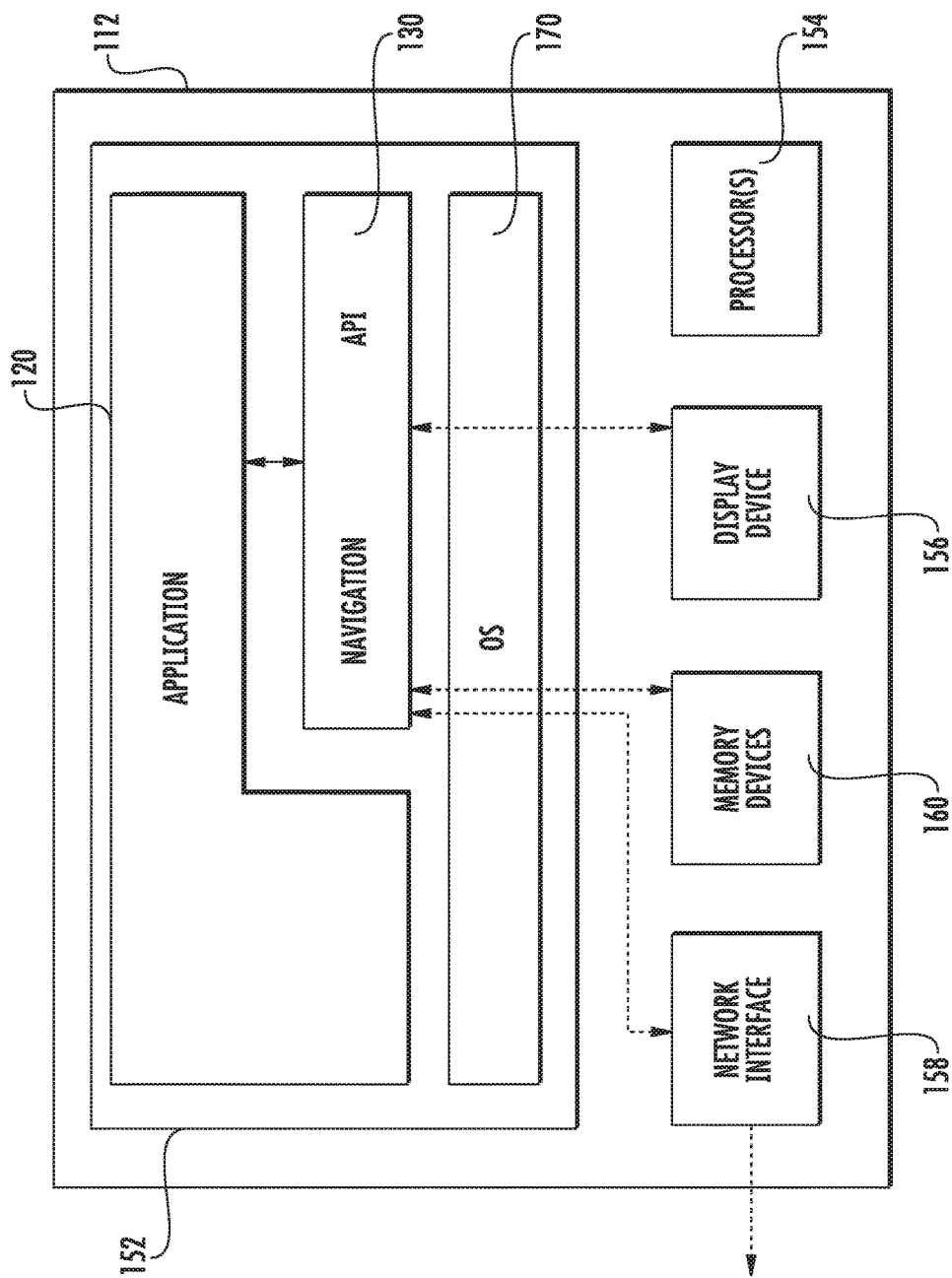
FIG. 4 depicts a block diagram of an example user device implementing a software application according to example embodiments of the present disclosure.

FIG. 4 depicts an example user device 112 configured to implement a navigation API 130 according to example embodiments of the present disclosure. As shown, the user device 112 includes an instruction memory 152, one or more processors 54 configured to execute instructions stored in the memory 152, a display device 156, a network interface 158 that supports network communications, and a storage memory 160. For clarity, the instruction memory 152 and the storage memory 160 are illustrated separately. It will be understood, however, that the components 152 and 160 also can be regions within the same memory module. More generally, the user device 112 can include one or several additional processors, memory devices, network interfaces, which may be provided separately or on a same chip or board. Further, the components 152 and 160 may include persistent memory (e.g., flash memory), volatile memory (e.g., RAM), or both, or other suitable memery.

The instruction memory 52 can store sets of instructions of an operating system (OS) 170, a navigation API 130, and a software application 120. The OS 170 can be a mobile OS developed specifically for mobile devices. As such, the OS 170 can include functions that allow the software application to access data such as wireless network parameters (e.g., identity of the wireless network, quality of service), as well as invoke such services as telephony, location determination (e.g., via global positioning service (GPS) or WLAN), wireless network data call origination, etc. In other implementations, the OS 170 is a general-purpose operating system that operates on both mobile and stationary devices, such as smartphones and desktop computers, for example. In some example implementations, the OS includes or based upon an Android® mobile operating system developed by Google Inc. or similar operating system to implement an Android operating platform. However, other suitable operating systems can be used without deviating from the scope of the present disclosure.

The software application 120 can be, for example, a mapping application, a navigation application, ride share application, an application to assist with delivery, a social media application, etc. Further, the software application 120 can be a web browser application that invokes the navigation API 130 to display navigation information within an allocated portion of a browser window. In general, the navigation API 130 can be made available to any suitable software application that executes on the user device 120. Also, multiple different software applications may invoke the navigation API 130.

As discussed above, the software application 120 can invoke the navigation API 130 to embed a navigation service in the software application 120. For instance, in one example, a software application 120 can provide one or more waypoints to the navigation API 130. The navigation API 130 can request navigation data from a remote navigation data provider to determine a navigation route based on the one or more waypoints. The navigation API 130 can include sets of instructions to control the presentation of navigation information to the user as part of the navigation service. The API 130 can include one or more event listeners used to update the navigation information presented to the user, for instance, based on user location as determined by a positioning system implemented as part of the user device.

In some embodiments, the positioning system can include one or more devices or circuitry for determining the position of a device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position.

The navigation API 130 can be implemented as one or several functions, a data structure, etc. Further, the API 130 may include compiled code that executes directly on the processor(s) 154 or, alternatively, instructions in any other form such as a scripting language interpreted at runtime by the application 120. The API 130 in one example implementation includes well-documented prototypes of several functions which a developer can include in the code of the software application 120, as well as instructions that implement these functions. In some embodiments, the API 130 can be provided to the developer as a static library.

Figure 5:
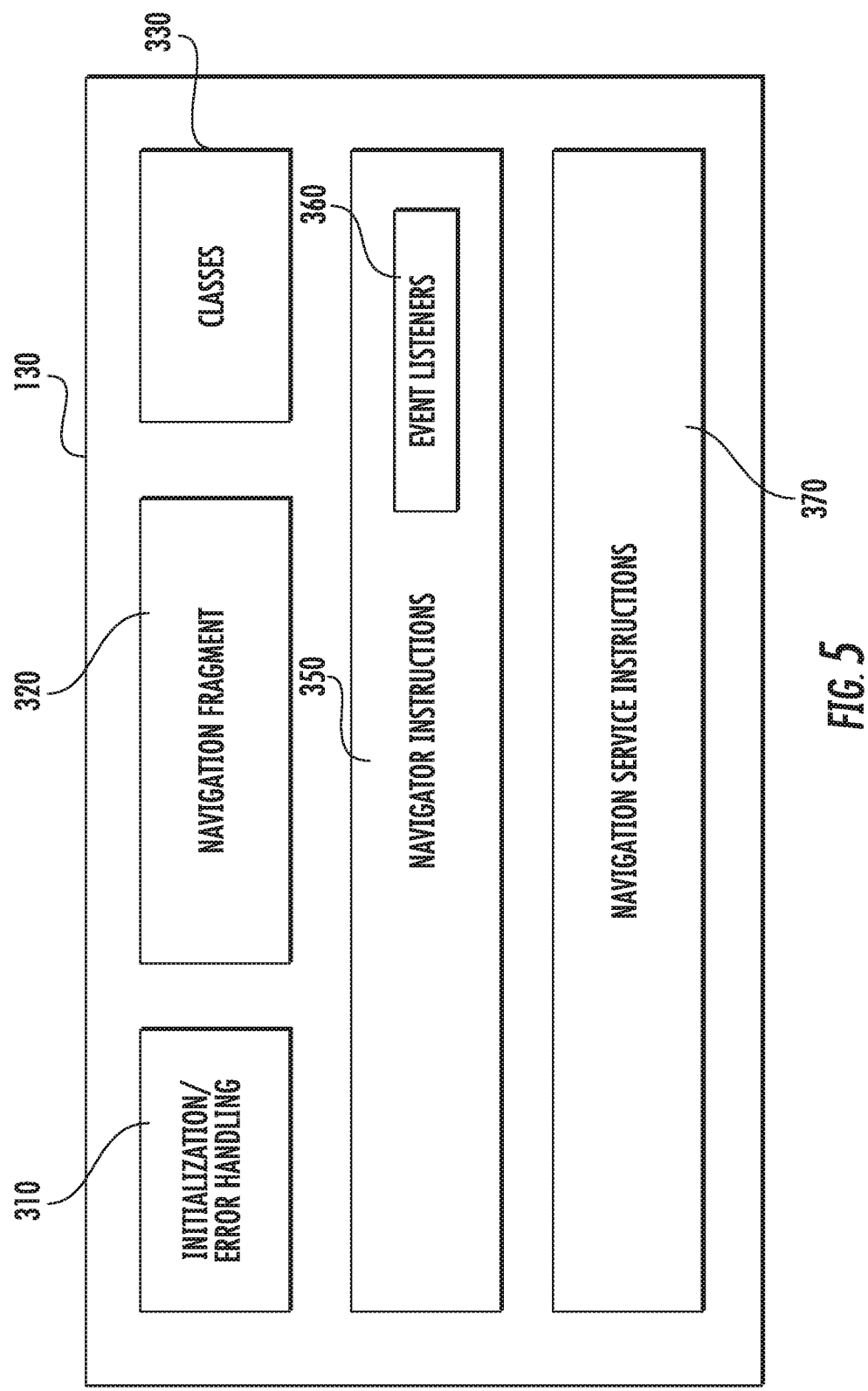
FIG. 5 depicts a block diagram of an example navigation application programming interface according to example embodiments of the present disclosure.

FIG. 5 depicts a block diagram of example sets of instructions that a developer can use to configure the navigation API 130 according to example embodiments of the present disclosure. The sets of instructions can include, for instance, initialization and error handling instructions 310; navigation fragment instructions 320 that can specify parameters to control the display of the visual output of the navigation service; various classes 330 specified in the instructions that allow a developer, for instance, to add markers to a map and to specify waypoints; navigator instructions 350 that can specify parameters to control the implementation of the navigation service, and a navigation service instructions 370 that can specify parameters to control the interaction with the navigation data provider for requesting and receiving navigation information (e.g., routing information). In some embodiments, the navigation service instructions 370 can also include the logic used to implement the navigation service as part of the software application (e.g., to move indicia indicative of user position along a route).

In some embodiments, the navigation API 130 can be implemented as follows. First, a developer of a software application can add the navigation fragment class 320 to their application to display the visual output (e.g., graphical user interface component)) of the navigation service. The developer can control the navigation service by specifying one or more parameters in the navigator instructions 350. When not in a navigation mode, the navigation fragment class 320 can be configured to display, for instance, a top down overview map. Calling a set waypoint function in the navigator instructions 350 (e.g., Navigator.setWapoint ( . . . )) can display a navigation route in polyline on a map with a mark for each waypoint. The developer can trigger navigation to the waypoint by calling an enter navigation mode function in the navigator instructions 350 (e.g., Navigator.enterNavigationMode( )).

Navigation mode can continue until the waypoint is reached (e.g., as determined by an event listener) or until an exit navigation mode function in the navigator instructions 350 is called (e.g. Navigator.exitNavigationMode( )). In some implementations, navigation mode can be used without a waypoint in a free navigation format. In a free navigation format, the location of the user (e.g., based on a positioning system of the user device) can be used to update the user's current location on a map. In some embodiments, the developer can add markers to the map using a get map function specified in the Navigation Fragment instructions 320 (e.g., NavigationFragment.getMap( )).

Referring to FIG. 5, the initialization and error handling instructions 310 can be an entry point for the API 130 from which a developer can obtain access to the navigator instructions 350. In this way, the initialization and error handling logic can be handled separate from the navigation logic. The initialization and error handling instructions 310 can require an API key to authorize the developer to use the API. The initialization and error handling instructions 310 can also require a user to accept terms and conditions provided by the navigation data provider before using the navigation service.

In some example embodiments, the initialization and error handling instructions 310 can be implemented as follows:

```
class NavigationApi {
    /**
     * Requests an instance of the {@link Navigator}, which is returned via a
     * {@link NavigatorListener}. Note that Navigator is a singleton; if
     * you call this method multiple times, each call will return the same Navigator.
     */
    static void getNavigator ( Application application, NavigatorListener listener );
    // Status codes for #initialize(Application).
    /**
     * The API key you supplied is not authorized to use the Navigation API. This
     * may be because the early access period has expired. Your app should fall
     * back to another navigation mechanism if this code is received, to ensure
     * that the experience doesn't break for users who haven't updated your app
     * after the Navigation API early access period expires.
     */
    @ErrorCode
    public static final int ERROR_NOT_AUTHORIZED = 1;
    /**
     * The user has not accepted Navigation Data Provider's terms. This can be remedied
     * by asking the user to accept Navigation Data Provider's navigation terms. See {@link
     * #createTermsActivityIntent(Context)} .
     */
    @ErrorCode
    public static final int ERROR_TERMS_NOT_ACCEPTED = 2;
    /**
     * The Navigation API is unable to access the internet.
     */
    @ErrorCode
    public static final int NETWORK_ERROR = 3;
    /**
     * Shows a dialog that directs the user to accept Navigation Data Provider's terms and
     * conditions. If a listener is provided it will be notified with the user's
     * response.
     */
    public static void showTermsAndConditionsDialog (
    Activity activity, @Nullable OnTermsResponseListener listener );
    /**
     * Returns {@code true} if the user has previously accepted Navigation Data Provider's
     * terms and conditions.
     */
    public static boolean areTermsAccepted ( Application application );
    /**
     * Reset the terms and conditions acceptance state - for testing.
     * Add a call to this before any calls to {@link NavigationApi} if you want
     * to test the terms and conditions dialog.
     */
    public static void resetTermsAccepted ( Application application );
    /**
     * Register a NavigatorListener with {@link #getNavigator(
     * Application, NavigatorListener)} to be notified about the status of said
```

-continued

```
        * {@link Navigator}. Note that only one of NavigatorListener's methods will be
        * called, and that all calls occur on the UI thread.
        */
       public interface NavigatorListener {
       /**
           * Indicates that a {@link Navigator} was created successfully, and returns it to
           * the caller.
           */
          void onNavigatorReady( Navigator navigator);
       /**
           * Indicates that an error occurred in initializing the {@link Navigator}.
           * {@code errorCode} is one of the @ErrorCode constants.
           */
          void onError( @ErrorCode int errorCode);
    }
    /**
          * Register an OnTermsResponseListener with {@link
                       #showTermsAndConditionsDialog}
          * to be notified whether the user accepts the terms and conditions.
          * The notification will occur on the UI thread.
          */
       public interface OnTermsResponseListener {
       /**
           * Indicates whether the terms and conditions were accepted by the user
           */
          void onTermsResponse( boolean accepted);
       }
    }
                    One example use case is a follows:
@Override
protected void onCreate(Bundle savedInstanceState) {
    super .onCreate(savedInstanceState);
    this .findViewById(R.id. start_button ).setOnClickListener(
        new View.OnClickListener( ) {
            @Override
            public void onClick(View v) {
                startNavigation( );
            }
        });
}
private void startNavigation( ) {
    // Request a Navigator
    NavigationApi. getNavigator (getApplication( ),
            new NavigationApi.NavigatorListener( ) {
        @Override
        public void onNavigatorReady(Navigator navigator) {
            // We obtained a Navigator, set a destination, start navigating,
            // Add UI to the screen
            navigator.setDestination(Waypoint. fromPlaceId (
                    getPlaceId( ), "Pickup location" ));
            navigator.startNavigation( );
            getFragmentManager( )
                .beginTransaction( )
                .add(R.id. body_container , new NavigationFragment( ))
                .commit( );
        }
        @Override
        public void onError( @NavigationApi.ErrorCode int errorCode) {
            switch (errorCode) {
            // The user hasn't accepted the terms yet; prompt them to.
            case NavigationApi. INIT_STATUS_TERMS_NOT_ACCEPTED :
                Dialog dlg =
                    NavigationApi.createTermsAcceptanceDialog(SimpleActivity. this );
                dlg.show( );
                // Callback TBD.
            }
        }
    });
}
```

The navigation fragment instructions 320 can specify one or more parameters to control implementation of the graphical user interface component. Developers can add the navigation fragment instructions 320 to display the visual output of navigation (e.g., an interactive map and turn-by-turn directions) in conjunction with the software application. In some embodiments, the navigation fragment instructions 320 can be implemented as a fragment in an Android based operating platform rather than as a view to reduce complexity. For instance, using a view implementation can require the developer to forward lifecycle methods (e.g., onCreate( ), onResume( ), etc.) to the view manually. In some embodiments, the navigation fragment instructions 320 can be implemented as a view without deviating from the scope of the present disclosure.

In an Android operating platform, a fragment can be a portion of a user interface of an application that can be placed in an activity. In some embodiments, multiple fragments can be implemented as part of an application to build a multi-pane user interface. A fragment can have its own lifecycle and can receive its own input events that can be added or removed while the activity is running. Example aspects of the present disclosure are discussed with implementing the navigation fragment instructions 320 in an Android operating platform for purposes of illustration and discussion. The navigation fragment instructions 320 can be implemented in other ways to provide similar functionality without deviating from the scope of the present disclosure.

The navigation fragment instructions 320 can include parameters that allow a developer to control which aspects of the graphical user interface component associated with the navigation service are shown. For instance, the developer can construct the graphical user interface with builder function in the navigation fragment instructions 320 (e.g., NavigationFragment.Builder). In some embodiments, the developer can choose whether to display a navigation header, a compass element, ETD information, or other information in conjunction with the navigation service.

In one embodiment, the graphical user interface component can be constructed as follows:
NavigationFragment f=new NavigationFragment.Builder ( )
   .setNavigationHeaderEnabled(true)
   .setEtaCardEnabled(false)
   .setCompassButtonEnabled(true)
   .build( );

As another example, the graphical user interface component can be constructed using XML, as follows:
<fragment android:name="com.navprovider.android. libraries.navigation.NavigationFragment"
   navigation:navigation_header_enabled="true"
   navigation:eta_card_enabled="false"
   navigation:compass_button_enabled="true"/>

In some embodiments, a fragment class interface can be implemented as follows:

```
class NavigationFragment {
    static class Builder {
        // Enables or disables the fragment's navigation header.
        Builder setNavigationHeaderEnabled( boolean enabled);
        // Enables or disables the fragment's ETA card (e.g., ETD
        information).
        Builder setEtaCardEnabled( boolean enabled);
        // Enables or disables the compass button.
        Builder setCompassButtonEnabled( boolean enabled);
        // Builds the NavigationFragment.
        NavigationFragment build( );
    }
    // Gets a reference to the fragment's Map, which can be used to
    // display markers and modify the camera.
    Map getMap( );
}
```

In alternative embodiments, the graphical user interface component can also be implemented as a view in an Android operating platform rather than as a fragment. When using the navigation view, various lifecycle events can be forwarded from the application activity.

For instance, in one embodiment the navigation view can be implemented as followed.

```
NavigationView mNavigationView;
@ Override
protected void onStart( ) {
    super .onStart( );
    mNavigationView.onStart( );
}
```

The following lifecycle methods may need to be forwarded for a navigation view set of instructions: onCreate, onStart, onResume, onPause, onStop, onDestroy, onConfigurationChanged, onSaveInstanceState.

In some embodiments, the API 130 can include various class instructions 330, such as a maps class, waypoint class, a lat/lng class, and a camera class. The maps class can a developer to add waypoints to a map. The maps class can also include various functions to control the depictions of the map in the graphical user interface component. For example, in some implementations, the map class can be implemented as follows:

```
class Map {
    // Constructs a marker with the specified options and adds it to the
map.
    Marker addMarker( MarkerOptions options);
    // Clears all markers from the map.
    void clear( );
    // Pans and zooms the map to show an overview of the entire route.
    // This will temporarily prevent the camera from following the user's
    position.
    // The camera can be reset to follow using {@link #resetCamera( )}.
    void showRouteOverview( boolean animate);
    // Pans and zooms the map to the specified location. This will
    // temporarily prevent the camera from following the user's position.
    // The camera can be reset to follow using {@link #resetCamera( )}.
    void setCamera( LatLng center, float zoom, boolean animate);
    // Resets the camera back to its default mode (i.e. if navigating, the
    // camera will follow the user's position).
    void resetCamera( boolean animate);
}
```

The waypoint class can create or specify waypoints from various data indicative of the location of the waypoint, such as a place identification, address, latitude/longitude coordinates, semantic name, or other place identification. In some implementations, the waypoint class can be specified as follows:

```
class Waypoint {
    // Creates a waypoint from a place ID. Throws an
    // IllegalArgumentException if the place ID was invalid.
    static Waypoint fromPlaceId( string placeId);
    // Creates a waypoint from a lat/lng and an optional title.
    static Waypoint fromLatLng( double latitude, double longitude,
        @Nullable String title);
}
```

The lat/lng class can be used to generate lat/lng variable indicative of place location based at least in part on data indicative of latitude and longitude. In one example, the lat/lng class can be implemented as follows:

```
class LatLng {
    /** Latitude, in degrees. This value is in the range [−90, 90]. */
    public final double latitude;
    /** Longitude, in degrees. This value is in the range [−180, 180). */
    public final double longitude;
    /**
     * Constructs a LatLng with the given latitude and longitude,
        measured in degrees.
```

```
 * @ param latitude The point's latitude. This will be clamped to
 * between -90 degrees and +90 degrees inclusive.
 * @param longitude The point's longitude. This will be normalized
 * to be within -180 degrees inclusive and +180 degrees exclusive.
 */
 public LatLng( double latitude, double longitude);
}
```

Another example class that can be implemented can be a camera class that can be used to adjust the position and perspective of the map being shown as part of the navigation. A reference to the current camera can be obtained using a get camera interface specified as part of the navigation fragment. In one example, the camera class can be implemented as follows:

```
class Camera {
    /**
     * Set the Camera to follow the location of the user. This is typically
     * called when starting turn-by-turn guidance to enter a "tilted"
       driving view.
     *
     * @param perspective A choice of {@link Perspective} specifying
     * what perspective the Camera should use when following.
     */
    void followMyLocation (@ Perspective int perspective );
    /**
     * Pans and zooms the map to show an overview of the remaining
     * route. This will temporarily prevent the camera from following the
       user's position.
     * <p>
     * The camera can be reset to follow the user using {@link
       #followMyLocation}.
     */
    void showRouteOverview( );
    @IntDef ({ Perspective .TILTED,
Perspective .TOP_DOWN_HEADING_UP,
Perspective .TOP_DOWN_NORTH_UP})
    @ interface Perspective {
        /**
         * A tilted perspective facing in the same direction as the user.
         * Commonly used during driving navigation.
         */
        int TILTED = 0 ;
        /**
         * A top-down perspective of the camera's target, facing in the
         * same direction as the user. This is equivalent to tapping the
           compass button during navigation.
         */
        int TOP_DOWN_HEADING_UP = 1 ;
        /**
         * A north-facing top-down perspective of the camera's target.
         * This is commonly used when showing an overview of a
           selection of markers.
         */
        int TOP_DOWN_NORTH_UP = 2;
}
```

The navigator instructions 350 can specify one or more parameters to control the implementation of the navigation service by the software application. In some embodiments, the navigator instructions 350 can be implemented as a singleton in an Android operating platform. This can allow the developer to implement the navigator instructions 350 without requiring use of the navigation fragment instructions 320. As a result, the navigation service can provide navigation information (e.g. using audio notifications) without a graphical user interface component. This can be useful when a user is completing a full screen task via the application invoking the API 130 while navigating. Moreover, there may not be a need to implement more than one set of navigator instructions at a given time.

The navigator instructions 350 can, for instance, determine if a route to one or more destination waypoints has been successfully calculated and received and can be configured to provide information indicative of whether a route was received, or whether there were various errors (e.g., network errors). The navigator instructions 350 can further set one or more waypoints and can control entry and exit into a navigation mode. The navigator instructions 350 can be used to enable driving simulation that can simulate driving along a computed route. The navigator instructions 350 can also specify parameters associated with audio guidance to provide audio cues or vibratory cues during navigation.

In one example embodiment, the navigator instructions 350 can be implemented as follows:

```
class Navigator {
    /**
     * A Route Status is a status code that represents the result of a route
     * calculation, accessed via the Future returned by
     * {@link #setDestination(Waypoint)}.
     */
    public enum RouteStatus {
        // A route to the destination was successfully calculated.
        OK,
        // A route to the destination could not be calculated.
        NO_ROUTE_FOUND,
        // A route to the destination could not be calculated because of a
          network error.
        NETWORK_ERROR,
        // A route to the destination could not be calculated because of
        // insufficient quota.
        QUOTA_CHECK_FAILED
    }
    // Sets the destination, replacing any previously set destination(s).
    // The future will return a {@link Route Status} representing the
    result.
    ListenableFuture < RouteStatus > setDestination( Waypoint waypoint);
    // Sets the list of upcoming navigation waypoints, replacing any
    // previouslyset list of waypoints.
    // The returned future will be set to true if a route was found
    // connecting all the desired waypoints, otherwise false.
    ListenableFuture<boolean> setWaypoints(List<Waypoint> waypoint);
    // Enters navigation mode. If a waypoint is set, navigation starts.
    void startNavigation( );
    // Exits navigation mode and goes back to the overview map.
    void stopNavigation( );
    // Enables or disables driving simulation. Useful for debugging. When
    // enabled, the indicia will automatically start moving along the
    // specified route towards the next waypoint.
    // if (BuildConfig.DEBUG) { Navigator.setSimulationEnabled(true); }
    void setSimulationEnabled( boolean enabled);
    // AudioGuidance is a set of flags used to specify what kinds of audio
    // guidance are used during navigation.
    public @interface AudioGuidance {
        /**
         * Specifies that voice guidance and vibrations should be disabled.
         * This flag should always be specified by itself; it is a mistake to
         * combine this with any other {@link AudioGuidance}flags.
         */
        int SILENT = 0;
        /**
         * Specifies that vibrations should be enabled.
         */
        int VIBRATION = 1;
        /**
         * Specifies that voice should be enabled. Note that this value
         * alone will not allow voice guidance to be played over Bluetooth;
         * to enable that, {@link
         * AudioGuidance.VOICE_WITH_BLUETOOTH} should be
           used instead.
         */
        int VOICE = 2;
        /**
         * Specifies that voice guidance should be enabled, and
         * transmitted over Bluetooth if available. This flag enables a
         * superset of the functionality of {@link
           AudioGuidance.VOICE}.
```

```
    */
    int VOICE_WITH_BLUETOOTH = 4;
    /**
     * Sets which types of audio guidance (including vibration) are
     * enabled. By default, vibration, voice, and voice over Bluetooth
     * (if available) are enabled.
     * @param guidance A combination of {@link AudioGuidance}
     * flags specifying which types of audio guidance should be
     enabled.
     */
    void setAudioGuidance( @AudioGuidance int guidance);
...
}
```

According to example aspects of the present disclosure, the navigator instructions 350 can implement one or more event listener interfaces 360. The event listener interfaces 360 can be registered with the navigator instructions 350. The event listener interfaces 360 can be used for call backs to obtain data associated with one or more navigation events to update the navigation information provided as part of the navigation service. A navigation event can be any event which can affect the navigation information presented to the user. For instance, the navigation event can be a change in user position, a change in traffic conditions, a change in one or more waypoints, a change in route information, a change in ETD information, etc. In this way, the event listeners can be used to update the navigation information presented as part of the navigation service as a user is traveling or navigating along a route. In one example, the event listener interfaces 360 can be registered with the navigator instructions 350 as follows:

```
class Navigator {
....
    // Callbacks. Set to null to remove.
    void setLocationListener( @Nullable LocationListener listener);
    void setArrivalListener( @Nullable ArrivalListener listener);
    void setRouteChangedListener( @Nullable RouteChangedListener
    listener);
    /**
     * Registers a listener for when the remaining time or distance to the
     * destination changes by more than a specified threshold. Overrides
     * any previously registered listeners.
     * <p>
     * The listener could be called as a result of (for example) user
     * movement, a change in traffic conditions, a change in route, a
     * change in destination, or when the remaining time and distance
     first become known.
     *
     * @param timeChangeThresholdSeconds If the absolute change in
     * the remaining timein seconds is greater than or equal to this value,
     * then the listener is called. This threshold must not be negative.
     * @param distanceChangeThresholdMeters If the absolute change in
     * the remaining distance in meters is greater than or equal to this
     * value, then the listener is called. This threshold must not be
     negative.
     * @param listener The listener to register. Must not be
     {@code null}.
     */
    void setRemainingTimeOrDistanceChangedListener(
        int timeChangeThresholdSeconds,
        int distanceChangeThresholdMeters,
        RemainingTimeOrDistanceChangedListener listener) ;
    /**
     * Clears the listener for changes in remaining time or distance.
     */
    void clearRemainingTimeOrDistanceChangedListener( );
}
```

Figure 6:
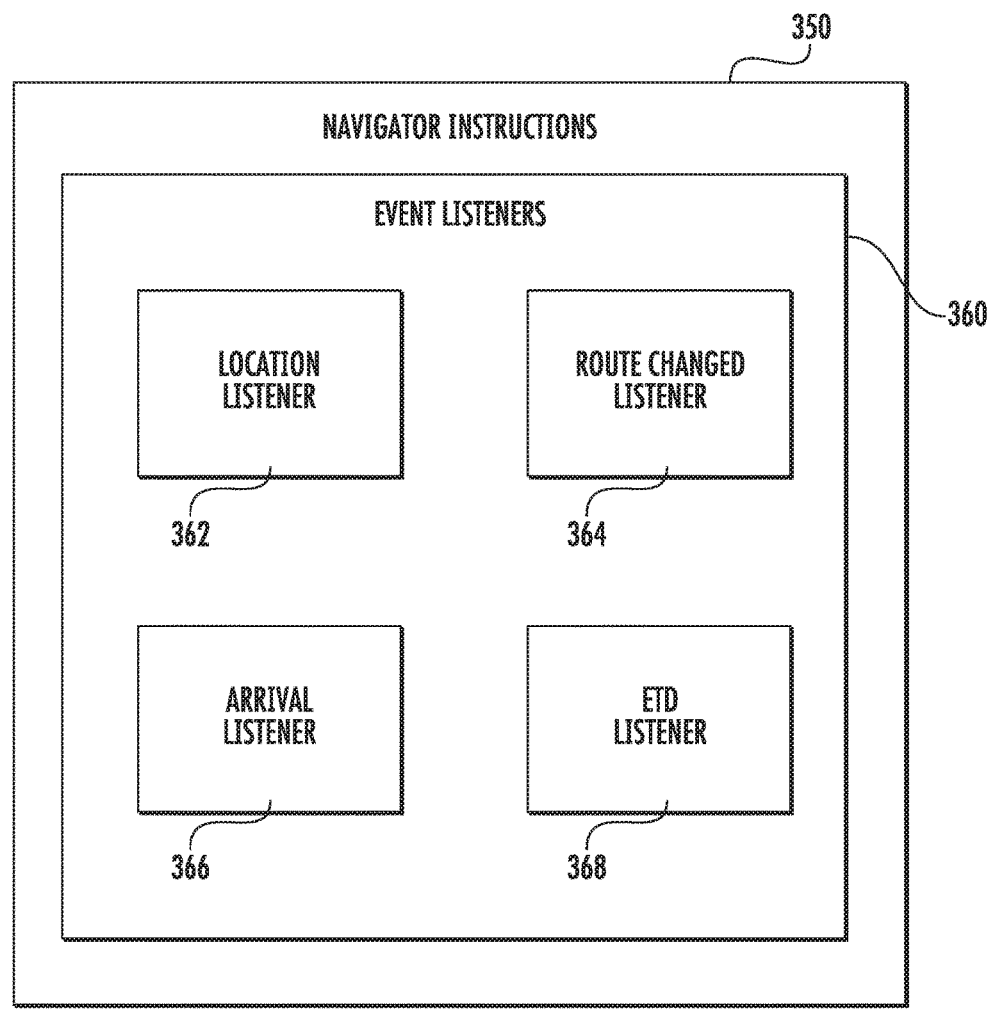
FIG. 6 depicts a block diagram of example navigator instructions associated with a navigation application programming interface according to example aspects of the present disclosure.

FIG. 6 depicts a block diagram of the one or more event listener interfaces 360 that can be implemented as part of the navigator instructions 350 according to example embodiments of the present disclosure. As illustrated in FIG. 6, the one or more event listener interfaces 360 can include a location listener interface 362, a route changed listener interface 364, an arrival listener interface 366, and/or an ETD listener interface 368. The event listener interfaces 360 can be configurable event listener interfaces 360 such that the developer can specify various settings and parameters of the event listener interface 360 in the instructions associated with the API 130, such as in the navigator instructions 350.

The location listener interface 362 can be configured to be called (e.g., by the navigator interface) to update a current location of a user in the navigation service. In this way, the navigation service can display the current location of the user along a navigation route as the current location of the user is updated. One example location listener interface 362 can be implemented as follows:

```
interface Navigator.LocationListener {
    // Called when the driver's road-snapped location/heading is updated.
    // This is provided at the fastest available rate from the navigation
    // engine.
    void onLocationUpdated(android.location. Location location);
}
```

The route changed listener interface 364 can be configured to be called to update route information when the calculated route changes. For instance, the route information can be updated when a better route is calculated or when a user diverges from a recommended route. The route provided by the route changed listener interface 364 can be provide in polyline for display in conjunction with a map as part of the navigation service. One example route changed listener interface 364 can be implemented as follows:

```
interface Navigator.RouteChangedListener {
    // Called when the route changes, e.g. when a better route is calculated
    // or when the driver diverges from the recommended route.
    // The route provided is the polyline for the new route.
    void onRouteChanged( List < LatLng > route);
}
```

The arrival listener interface 366 can be called to signal when a user has arrived at a specified waypoint. For instance, the arrival listener interface 366 can be called to exit a navigation mode when a user has arrived at a waypoint. One example arrival listener interface 366 can be implemented as follows:

```
interface Navigator.ArrivalListener. {
    // Called when the driver has arrived at the specified waypoint.
    void onArrivedAtWaypoint( Waypoint waypoint);
}
```

The ETD listener interface 368 (e.g., a remaining time or remaining distance listener interface) can be called when a time remaining or a distance remaining to waypoint has changed by more than a threshold. The threshold can be specified as a parameter in the navigator instructions 350. The ETD information (e.g., time remaining or distance remaining) can change as a result of navigation events such as user movement (e.g., a change in user position), a change in traffic conditions, a change in route, a change in one or more waypoints, or when the remaining time or the remaining distance first become known. The updated ETD information can be presented to the user as part of the navigation service, for instance, as part of a graphical user interface component or through audio guidance or other notification. One example ETD listener interface 368 can be implemented as follows:

```
interface Navigator.RemainingTimeAndDistanceChangedListener {
    /**
     * Called on the UI thread when the time or distance to the
     * destination has changed by more than the thresholds specified in
     * {@link Navigator #setRemainingTimeOrDistanceListener(int,int,
     * RemainingTimeOrDistanceChangedListener)}. This could be a
     * result of (for example) user movement, a change in traffic
     * conditions, a change in route, achange in destination, or when the
     * remaining time and distance first become known.
     */
    void onRemainingTimeAndDistanceUpdated(
        Waypoint waypoint, int remainingTimeSeconds, int
        distanceMeters);
}
```

Navigation service instructions 370 shown in FIG. 5 can actually power the navigation service (e.g. can provide the logic for the navigation service) and can be controlled by the parameters set forth in the navigator instructions 350. The navigation service instruction 370 can control interaction with a routing engine to provide navigation information based on parameters specified in the navigator instructions 350 and navigation events as determined by one or more event listener interfaces 360. In some embodiments, developers do not specify parameters for the navigation service instructions 370 and the navigation service instructions act as an internal interface for the API 130. Developers can implement the navigation service instructions 370, for instance, by adding a reference to the navigation instructions to the manifest.xml for the software application. For instance, the navigation service instructions 370 can be implemented as follows:
<service android:name="com.navprovider.android.libraries.navigation.NavigationService"/>

Figure 7:
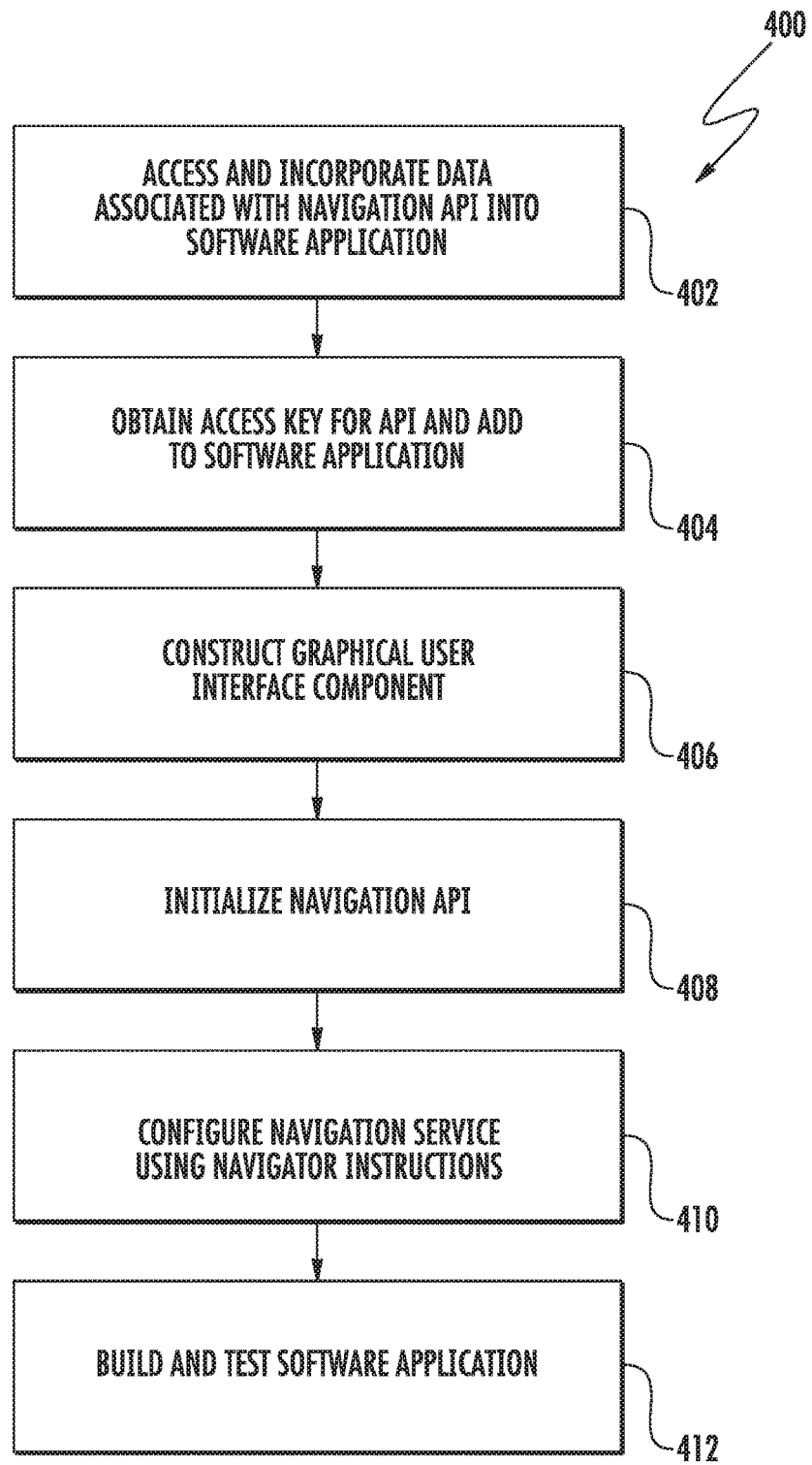
FIG. 7 depicts a flow diagram of an example method according to example embodiments of the present disclosure.

FIG. 7 depicts a flow diagram of one example method (400) of integrating a navigation service into a software application using a navigation API according to example embodiments of the present disclosure. The method (400) can be implemented using, for instance, the API 130 depicted in FIG. 5. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At (402), the method can include accessing and incorporating data (e.g., files) associated with the navigation API 130 into the software application. For instance, a user can download files associated with the navigation API 130, for instance, over a network (e.g., the Internet) and can provide the navigation API files into a subdirectory under a gradle root associated with the software application. Libraries associated with the navigation API 130 and third-party dependencies can be added to the software application.

At (404), an access key for enabling the navigation API 130 can be obtained. In some embodiments, the access key can be obtained from the navigation data provider. The access key can be added to the software application, for instance, to the androidmanifest.xml associated with the software application.

At (406), the developer can construct the graphical user interface component associated with the navigation service by specifying parameters in the navigation fragment set of instructions 320 (or in some embodiments, a navigation view set of instructions). This can add an interactive map and turn-by-turn navigation graphical user interface component to the software application.

At (408), the developer can use initialization and error handling instructions to initialize the navigation API 130. Once the navigation API is initialized, the navigator instructions 350 can be used to control and configure the navigation service as shown at (410). For example, various functions can be specified to determine when to start and exit a navigation mode. According to particular embodiments of the present disclosure, one or more event listener interfaces 360 can be included in the navigator instructions 350 to capture navigation events, such as arrival, route changes, user position changes, ETD information changes, etc. At (412), the method can include building and testing the software application with the integrated navigation service.

Figure 8:
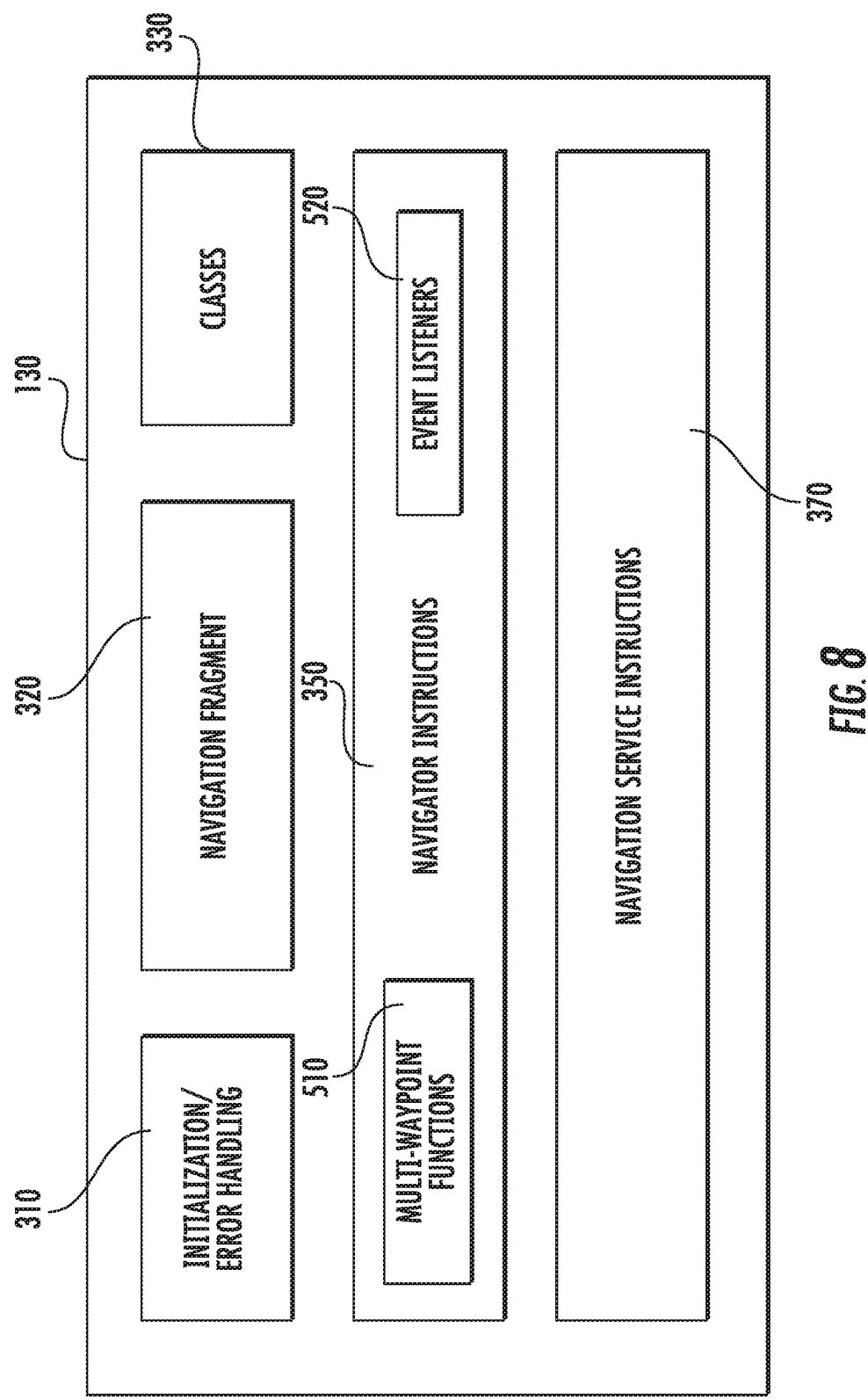
FIG. 8 depicts a block diagram of an example navigation application programming interface according to example embodiments of the present disclosure.

In some example embodiments, the navigation API 130 can be configured to accommodate multi-waypoint routing among a plurality of different waypoints. For instance, FIG. 8 depicts a block diagram of an example navigation API 130 configured to accommodate multi-waypoint routing. The navigation API 130 can be similar to the navigation API 130 shown in FIG. 5. For instance, the navigation API 130 of FIG. 8 can include initialization and error handling instructions 310, navigation fragment instructions 320 (or in some embodiments navigation view instructions), various class instructions 330 (e.g., map class, waypoint class, latlng class, camera class, etc). In addition, the API 130 can include navigator instructions 350 and navigation service instructions 370. The navigator instructions 350 can specify parameters to control the implementation of the navigation service, and navigation service instructions 370 that can control the interaction with the navigation data provider for requesting and receiving navigation information.

The navigator instructions 350 can include one or more multi-waypoint functions 510 and one or more multi-waypoint event listener interfaces 520 to accommodate multi-waypoint routing by the navigation service. The multi-waypoint event listener interfaces 520 can be registered with the navigator instructions 350. The event listener interfaces 520 can be used for call backs to obtain data associated with one or more navigation events to update the navigation information provided as part of the navigation service. For instance, the navigation event can be a change in user position, a change in traffic conditions, a change in one or more of the plurality waypoints, a change in route information of one or more route segments in a multi-waypoint route, a change in ETD information to a next destination in a multi-waypoint route, etc.

The multi-waypoint functions 510 can be used to implement various functions associated with multi-waypoint routing. For instance, the multi-waypoint functions can be used to set one or more waypoints to make a multi-waypoint route, access ETD information for each of the plurality of the waypoints along the multi-waypoint route, access location information associated with each of the plurality of waypoints along the multi-waypoint route, access route segments between waypoints along the multi-waypoint route, and access where a user has been along a multi-waypoint route during a particular navigation session.

Figure 9:
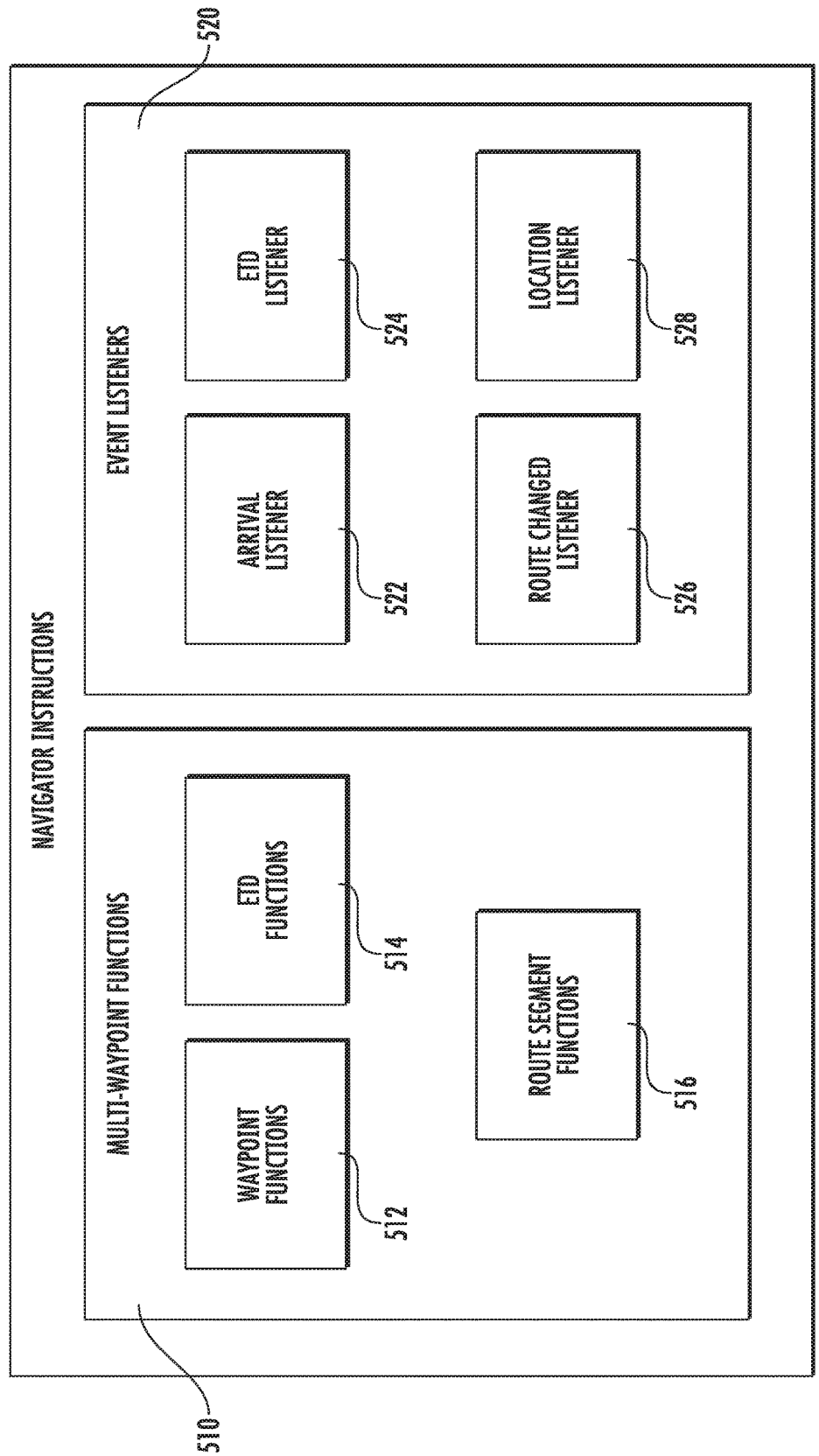
FIG. 9 depicts a block diagram of example navigator instructions associated with a navigation API according to example aspects of the present disclosure.

FIG. 9 depicts a block diagram of the various multi-waypoint functions 510 and event listener interfaces 520 that can be used as part of or registered with the navigator instructions 350 to implement multi-waypoint navigation according to example embodiments of the present disclosure. For example, the multi-waypoint functions 510 can include one or more waypoint functions 512 that can be used to set and manage a plurality of waypoints for a multi-waypoint route. In one embodiment, the waypoint functions 512 can include a set multi-waypoint function, a set single waypoint function, a continue to next waypoint function, and clear waypoint function. The set multi-waypoint function can be configured to set a plurality of waypoints for a multi-waypoint route input via a list of waypoints. The set multi-waypoint function will set the multiple waypoints (overriding any previous waypoints), which can be visited in the order specified in the list. The function can return future for a route status function (which determines the status of a calculated route). This can resolve to OK if a multi-waypoint route is generated for the multiple waypoints. An error code can be generate for a network or quota error. In one embodiment, the set multi-waypoint function can be implemented in the navigator instructions 350 as follows:

ListenableResultFuture<RouteStatus>setDestinations (List<Waypoint>destinations)

A set single waypoint function can be used as a convenience method to set a single waypoint for a navigation route. In one embodiment, the set single waypoint function can be implemented in the navigator instructions 350 as follows:

ListenableResultFuture<RouteStatus>setDestination(Waypoint destination)

A continue to next waypoint function can be used to initiate navigation to a next waypoint in a multi-waypoint navigation section. In some embodiments, this function can be required to be called explicitly. In these embodiments, the API may not move onto the next waypoint automatically. The continue to next destination function can return an exception if there are no waypoints remaining in the multi-waypoint route. In some embodiments, the continue to next destination function can be implemented in the navigator instructions 350 as follows:

void continueToNextDestination( ) throws NoNextDestinationException to Waypoint continueToNextDestination( )

A clear waypoint function can be used to clear one or more (e.g., all) previously set waypoints. This function can also stop navigation if navigation was running. In some embodiments, the clear waypoint function can be implemented in the navigator instructions 350 as follows:

void clearDesintations( )

As shown in FIG. 9, the one or more event listeners 520 can include an arrival event listener interface 522. The arrival event listener interface can be called when a user has arrived at a particular waypoint. In some embodiments, the arrival event listener interface 522 can be registered with the navigator instructions 350 as follows:

Void ArrivalListener.onArrivedAtWaypoint(Waypoint waypoint)

The one or more event listeners 520 can further include an ETD listener interface 524. The ETD listener interface can be called to update ETD information when a distance remaining or a time remaining to a next waypoint in the plurality of waypoints of a multi-waypoint route changes by more than a threshold. The threshold can be specified by the developer in the navigator instructions. For instance, in some embodiments, the ETD listener interface 524 can be registered with the navigator instructions 350 as follows:

void setRemainingTimeOrDistanceChangedListener(int seconds, int metres, listener)
/* Registers a listener to receive ETD updates, any time the ETD to
* the next destination changes by more than seconds or meters.
*/
void RemainingTimeOrDistanceChangedListener.onChanged( )
/* This callback is fired each time the ETD to the next destination has
* changed by more than the thresholds set in
setRemainingTimeOrDistanceChangedListener( )
*/

The multi-waypoint functions 510 can include a get ETD function 514. The get ETD function can obtain ETD information (e.g., remaining time and/or remaining distance) for a specified waypoint along a multi-waypoint route. In some embodiments, the get ETD function 514 can be implemented in the navigator instructions 350 as follows:

@Nullable TimeAndDistance getTimeAndDistance(Waypoint waypoint)

The multi-waypoint functions 510 can further include a get next ETD function. The get next ETD function can return ETD information (e.g., remaining time and/or remaining distance) to a next waypoint in the multi-waypoint route. If there are no next waypoints, the function can return null. In some embodiments, The get next ETD function can be implemented in the navigator instructions 350 as follows:

@Nullable TimeAndDistance getNextTimeAndDistance( )

The event listener interface 520 can further include a route changed event listener interface 526. The route changed event listener interface 526 can be registered with the navigator instructions to provide updates when a multi-waypoint navigation route changes. The route changed event listener interface 526 can be called when any route segment of a multi-waypoint navigation route changes. For instance, the route changed event listener interface 526 can be called when the initial multi-waypoint route changes, when a user deviates from the navigation route, if the user manually selects another navigation route, etc. In some embodiments, the route changed event listener interface 526 can be implemented in the navigator instructions 350 as follows:

void setRouteChangedListener(RouteChangedListener listener)
/* Registers a listener to be notified each time the route changes, for example on the
* initial route configuration from the server, each time the driver deviates from course, if
* the driver manually selects an alternative route by tapping it on the screen. This will be
* fired when any segment of the route changes.
*/
RouteChangedListener.onRouteChanged( )
/* This callback is fired when the route changes (as defined above).
*/

In some embodiments the ETD information (e.g., TimeAndDistance) is an immutable type. For instance, TimeAndDistance can be implemented as follows:

public interface TimeAndDistance {
    /* The number of meters from the current position to this waypoint.
    */
    public int getMeters( );
    /* The estimated number of seconds before arriving at this waypoint.
    */
    public int getSeconds( );
}

The multi-waypoint functions 510 can include get route segment functions 516. The get route segment functions can include a get current route segment function to return a current route segment to the next waypoint, a list route segment function to list all rout segments in a multi-waypoint navigation route, and a get traveled route segment to get route segments already traveled in the multi-waypoint navigation route. In some embodiments, the get route segment functions can be implemented as follows:

@Nullable RouteSegment getCurrentRouteSegment( )
/* Returns the current leg of the journey. This RouteSegment will have its start position as
* the most recently known position of the device. If there is no next destination, it will
* return null.
*/
List<RouteSegment>getRouteSegments( )
/* Returns a list of RouteSegments in the journey. The first RouteSegment will be what
* would have been returned by getCurrentRouteSegment( ) followed by RouteSegments
* corresponding to each unreached destination. It is guaranteed that the LatLng lists for
* consecutive RouteSegments start and end with the same value.
*/
List<LatLng>getTravelledRoute( )
/* Returns the route travelled during this navigation session (since the last call to
* startGuidance( )), generated off roadsnapped location updates, and simplified to
* remove redundant points (e.g. replacing consecutive colinear points with a single line
* segment).
*/

In some embodiments, RouteSegment can be an immutable type. For instance, RouteSegment can be implemented as follows:

```
public interface RouteSegment {
  /* The destination this route segment ends at.
  */
    public Waypoint getDestinationWaypoint( );
    /* The LatLng this route segment ends at. This will in general not
    * coincide with the Waypoint, unless the Waypoint is positioned
    * directly on a road.
    */
    public LatLng getDestinationLatLng( );
    /* The route itself.
    */
    public List<LatLng> getLatLngs( );
}
```

The event listener interfaces 520 can further include a location listener interface 528. The location listener interface 528 can similar to the location listener interface 362 discussed with reference to FIG. 6. The location listener interface 528 can be configured to be called (e.g., by the navigator interface) to update a current location of a user in the navigation service. In this way, the navigation service can display the current location of the user along a multi-point navigation route as the current location of the user is updated.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A non-transitory computer-readable medium storing instructions that implement an application programming interface for providing a navigation service as part of a software application executed on a computing device, the computing device having one or more processors and a display device, the computing device configured to communicate with a navigation data provider via a communication network, the application programming interface comprising:

a first set of instructions specifying one or more first parameters to control the implementation of a navigation service by the software application, the navigation service operable to provide navigation information to a user of the software application, the first set of instructions implemented as a class;

a second set of instructions specifying logic to control interaction with a routing engine provided by the navigation data provider based at least in part on the one or more first parameters specified in the first set of instructions;

a multi-waypoint function specified as part of the first instructions implemented as a class operable to set a plurality of waypoints for a navigation route input via a list, the multi-waypoint function comprising one or more parameters specifiable by a developer as part of the first set of instructions to control operability of multi-waypoint navigation; and a continue to next destination function specified as part of the first set of instructions operable to be called to obtain navigation information associated with navigating a user to a second waypoint in a multi-waypoint navigation route when the user has arrived at a first waypoint in the multi-waypoint navigation route;

wherein the application programming interface is operable to receive the multi-waypoint navigation route determined based on the plurality of waypoints, the multi-waypoint navigation route comprising a plurality of route segments;

wherein the first set of instructions specify one or more event listener interfaces comprising a remaining time and distance changed listener interface operable to be called when a time remaining or a distance remaining to a next waypoint in the multi-waypoint navigation route has changed by more than a threshold, the threshold specified as a parameter in the first set of instructions.

2. The non-transitory computer-readable medium of claim 1, wherein the multi-waypoint function is configured to receive data indicative of the plurality of waypoints as the list of waypoints.

3. The non-transitory computer-readable medium of claim 1, wherein the one or more event listener interfaces are operable to obtain data associated with one or more navigation events to update the navigation information provided as part of the navigation service.

4. The non-transitory computer-readable medium of claim 1, wherein the one or more event listener interfaces comprise a location listener interface operable to be called to update a current location of a user in the navigation service.

5. The non-transitory computer-readable medium of claim 1, wherein the one or more event listener interfaces comprise a route changed listener interface operable to be called when one of the plurality of route segments determined by the routing engine changes.

6. The non-transitory computer-readable medium of claim 1, wherein the application programming interface comprises a get time remaining or distance remaining function that is operable to return an estimated time remaining or distance remaining to a specified waypoint of the plurality of waypoints.

7. The non-transitory computer-readable medium of claim 1, wherein the application programming interface comprises a get route segment function that is operable to return one or more route segments in the multi-waypoint navigation route.

8. The non-transitory computer-readable medium of claim 7, wherein the third set of instructions specifies the display of a multi-waypoint navigation route determined by the routing engine in polyline on a map when in a navigation mode.

9. The non-transitory computer-readable medium of claim 7, wherein the third set of instructions specifies the display of a top down view of a map when not in a navigation mode.

10. The non-transitory computer-readable medium of claim 1, wherein the application programming interface comprises a get traveled route segment function that is operable to return route segments of the multi-waypoint route already travelled by a user.

11. The non-transitory computer-readable medium of claim 1, wherein the application programming interface comprises a third set of instructions specifying one or more third parameters to control the display of a graphical user interface component associated with the navigation service on the display device in conjunction with a software application.

12. A method for integrating a navigation service as part of a software application on a computing device having one or more processors, the method comprising:
accessing data associated with a navigation application programing interface;
incorporating the data associated with a navigation programming interface into the software application;
constructing a graphical user interface component associated with the navigation service using a first set of instructions associated with the navigation application programming interface, the first set of instructions specifying one or more parameters to control a display of the graphical user interface component associated with the navigation service on the display device in conjunction with a software application; and
configuring the navigation service using a second set of instructions associated with the navigation application programming interface, the second set of instructions specifying one or more parameters to control the implementation of the navigation service by the software application, the second set of instructions implemented as a class;
wherein the second set of instructions comprises a multi-waypoint function operable to set a plurality of waypoints for a navigation route input via a list, the multi-waypoint function comprising one or more parameters specifiable by a developer as part of the second set of instructions to control operability of multi-waypoint navigation, the navigation application programming interface operable to receive a multi-waypoint navigation route determined based on the plurality of waypoints, the multi-waypoint navigation route comprising a plurality of route segments;
wherein the second set of instructions comprises a continue to next destination function, the continue to next destination function operable to be called to obtain navigation information associated with navigating a user to a second waypoint in the multi-waypoint navigation route when the user has arrived at a first waypoint in the multi-waypoint navigation route;
wherein the second set of instructions specify one or more event listener interfaces comprising a remaining time and distance changed listener interface operable to be called when a time remaining or a distance remaining to a next waypoint in the multi-waypoint navigation route has changed by more than a threshold, the threshold specified as a parameter in the second set of instructions.

13. The method of claim 12, wherein the method comprises:
obtaining an access key for enabling operation of the navigation application programming interface; and
adding the access key to the software application.

14. The method of claim 12, wherein the method comprises initializing the navigation application programming interface using a set of initialization and error handling instructions associated with the navigation application programming interface.

15. The method of claim 12, wherein the one or more event listener interfaces comprise a location listener interface operable to be called to update a current location of a user in the navigation service.

16. A computing device, comprising:
a display device;
a network interface;
one or more processors; and
one or more memory devices, wherein the one or more memory devices store computer-readable instructions that implement an application programming interface invoked by a software application to obtain navigation information from a navigation data provider to provide a navigation service as part of the software application, the instructions comprising:
a first set of instructions specifying one or more first parameters to control the implementation of a navigation service by the software application, the navigation service providing navigation information to a user of the software application, the first set of instructions implemented as a class, the first set of instructions comprising a multi-waypoint interface configured to set a plurality of waypoints for a navigation route input via a list;
a second set of instructions specifying one or more second parameters to control interaction with a routing engine provided by the navigation data provider via the application programming interface to obtain the navigation information provided as part of the navigation service;

a third set of instructions specifying one or more third parameters to control a display of a graphical user interface component associated with the navigation service on the display device in conjunction with a software application;

wherein the second set of instructions comprises a waypoint function operable to set a plurality of waypoints for a navigation route, the waypoint function comprising one or more parameters specifiable by a developer as part of the second set of instructions to control operability of multi-waypoint navigation, wherein the application programming interface is operable to receive a multi-waypoint navigation route determined based on the plurality of waypoints, the multi-waypoint navigation route comprising a plurality of route segments;

wherein the first set of instructions comprises a continue to next destination function, the continue to next destination function operable to be called to obtain navigation information associated with navigating the user to a second waypoint in the multi-waypoint navigation route when the user has arrived at a first waypoint in the multi-waypoint navigation route;

wherein the first set of instructions specify one or more event listener interfaces comprising a remaining time and distance changed listener interface operable to be called when a time remaining or a distance remaining to a next waypoint in the multi-waypoint navigation route has changed by more than a threshold, the threshold specified as a parameter in the first set of instructions.

* * * * *